US010068596B2

(12) United States Patent
Staffaroni et al.

(10) Patent No.: US 10,068,596 B2
(45) Date of Patent: Sep. 4, 2018

(54) THERMALLY-ASSISTED MAGNETIC RECORDING HEAD HAVING SYMMETRIC OPTICAL SIDE SHIELDS

(71) Applicant: Headway Technologies, Inc., Milpitas, CA (US)

(72) Inventors: Matteo Staffaroni, San Ramon, CA (US); Tobias Maletzky, San Jose, CA (US); Xuhui Jin, San Jose, CA (US); Weihao Xu, San Jose, CA (US); Kenichi Takano, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/285,721

(22) Filed: Oct. 5, 2016

(65) Prior Publication Data

US 2018/0096702 A1    Apr. 5, 2018

(51) Int. Cl.
| | | |
|---|---|---|
| *G11B 11/00* | (2006.01) | |
| *G11B 5/48* | (2006.01) | |
| *G11B 5/39* | (2006.01) | |
| *G11B 5/31* | (2006.01) | |
| *G11B 5/00* | (2006.01) | |
| *G11B 7/135* | (2012.01) | |

(Continued)

(52) U.S. Cl.
CPC .......... *G11B 5/4866* (2013.01); *G11B 5/3133* (2013.01); *G11B 5/3169* (2013.01); *G11B 5/3906* (2013.01); *G11B 5/6088* (2013.01); *G11B 7/135* (2013.01); *G11B 7/22* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,272,102 B2 | 9/2007 | Challener | |
| 8,614,932 B1 * | 12/2013 | Sasaki | G11B 5/314 |
| | | | 369/13.17 |
| 9,053,717 B1 | 6/2015 | Matsumoto et al. | |

(Continued)

OTHER PUBLICATIONS

Co-pending U.S. Pat. No. HT15-024, U.S. Appl. No. 15/011,892, filed Feb. 1, 2016, "Self-Aligned Hybrid Au—Rh Near Field Transducer for Enhanced Reliability," by Matteo Staffaroni et al., 44 pgs.

(Continued)

*Primary Examiner* — Tan X Dinh
(74) *Attorney, Agent, or Firm* — Saile Ackerman LLC; Stephen B. Ackerman

(57) ABSTRACT

An optically shielded TAMR (thermally assisted magnetic recording) write head has a metal waveguide blocker formed against a distal end of a waveguide and a pair of symmetrically disposed optical side shields formed to either side of a plasmon generator formed above the waveguide. The waveguide focuses optical radiation on the adjacent plasmon generator where it excites plasmon modes that heat the recording medium with near-field energy and the waveguide blocker prevents excess optical radiation from blurring the spot on the recording region. The optical side shields further restrict loosely coupled optical radiation from reaching the recording region and blurring the optical spot and improves down-track and cross-track thermal gradients.

22 Claims, 8 Drawing Sheets

(51) Int. Cl.
    *G11B 7/22*     (2006.01)
    *G11B 5/60*     (2006.01)

(56) References Cited

U.S. PATENT DOCUMENTS

| | | | | |
|---|---|---|---|---|
| 9,218,827 | B1* | 12/2015 | Sasaki | G11B 5/17 |
| | | | | 369/13.33 |
| 9,218,835 | B1* | 12/2015 | Sasaki | G11B 5/314 |
| | | | | 369/13.33 |
| 2009/0052077 | A1* | 2/2009 | Tanaka | G11B 5/02 |
| | | | | 369/13.33 |
| 2011/0181979 | A1* | 7/2011 | Jin | G11B 5/314 |
| | | | | 369/13.33 |
| 2012/0020194 | A1* | 1/2012 | Jin | G11B 5/1278 |
| | | | | 369/13.13 |
| 2012/0092971 | A1 | 4/2012 | Schreck et al. | |
| 2015/0071044 | A1* | 3/2015 | Sasaki | G11B 5/6088 |
| | | | | 369/13.17 |
| 2015/0248906 | A1* | 9/2015 | Itagi | G11B 5/4866 |
| | | | | 369/13.33 |
| 2015/0262593 | A1* | 9/2015 | Sasaki | G11B 5/314 |
| | | | | 369/13.17 |
| 2017/0249962 | A1* | 8/2017 | Peng | G11B 5/4866 |
| | | | | 369/13.33 |

OTHER PUBLICATIONS

Co-pending U.S. Pat. No. HT15-021, U.S. Appl. No. 15/235,171, filed Aug. 12, 2016, "Plasmon Generator with Metallic Waveguide Blocker for TAMR," by Tsutomu Chou et al., 34 pgs.

\* cited by examiner

THERMALLY-ASSISTED MAGNETIC RECORDING HEAD HAVING SYMMETRIC OPTICAL SIDE SHIELDS

This Application is related to Ser. No. 15/235,171 Filing Date: Aug. 12, 2016 and to Ser. No. 15/011,892, Filing Date: Feb. 1, 2016, each assigned to a common assignee and incorporated herein by reference.

BACKGROUND

1. Technical Field

This disclosure relates to magnetic write heads that write on magnetic recording media, particularly to write heads that use Thermally Assisted Magnetic Recording (TAMR) enabled by the absorption of plasmon near-field energy.

2. Description

As hard disk drives have been increasing the recording density of the magnetic disks on which data storage occurs, the thin-film magnetic heads used to write and read that data have been required to improve their performance as well. The thin-film read/write heads most commonly in use are of a composite type, having a structure in which a magnetism detecting device, such as a magnetoresistive (MR) read sensor is used together with a magnetic recording device, such as an electromagnetic coil device. These two types of devices are laminated together and serve to read/write data signals, respectively, from/onto magnetic disks which are the magnetic recording media.

In general, a magnetic recording medium, on a microscopic level of composition, is a discontinuous body in which fine magnetic particles are assembled and held in place in a matrix. Each of these fine magnetic particles has a single magnetic-domain structure, so one recording bit is actually formed by a plurality of neighboring particles. In order to enhance the recording density, therefore, it is necessary to make the magnetic particles smaller in size so as to reduce irregularities at the boundaries of the bits. As the particles are made smaller, however, their volume decreases, so that the thermal stability of the magnetization may deteriorate. This causes a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, and thereby worsens the thermal stability. Though $K_U$ may be made greater at the same time as a measure against this problem, the increase in $K_U$ also increases the coercivity of the magnetic recording medium. However, the writing magnetic field intensity produced by a magnetic head is substantially determined by the saturated magnetic flux density of a soft magnetic material constituting a magnetic pole within the head. Therefore, there can be no writing if the coercivity exceeds a permissible value determined by the limit of writing magnetic field intensity.

One method proposed for solving such a problem affecting the thermal stability of magnetization is the so-called thermally assisted (or activated) magnetic recording (TAMR) scheme. In this approach, heat is applied locally to a magnetic recording medium immediately before applying a writing magnetic field, particularly while using a magnetic material having a large value of $K_U$. The heat then effectively lowers the medium's coercivity at the same position where the magnetic writing field is applied, so as to enable writing as though it were on a medium with generally lowered coercivity. This approach is expected to ultimately enable recording densities at between approximately 1 and 10 Tb/inch$^2$.

TAMR can be roughly classified into magnetic dominant recording and optical dominant recording, depending on the relative effects of the magnetic field and the optical heating. In magnetic dominant recording, the writing is attributed to the localized effects of the electromagnetic coil writer, while the radiation diameter of the incident light is greater than the track width (recording width). In optical dominant recording, by contrast, the writing is attributed to the light-radiating effect, as the radiation diameter of the incident light is substantially the same as the track width (recording width). Thus, the terms "magnetic dominant recording" and "optical dominant recording" imply the effects of spatial resolution to a magnetic field or a radiation field, respectively.

In the thermally assisted magnetic head recording apparatus, a light (optical radiation) source, such as a semiconductor laser diode, is typically suggested as the source of thermal energy. Light from such a light-emitting device is introduced into an optical waveguide configured to propagate the light. As waveguide core material, TaOx or SiON is typically used. The waveguide is surrounded with cladding material, typically Al2O3, SiON or SiO2. The combination supports a travelling mode of electromagnetic radiation. The waveguide propagated electromagnetic radiation is transferred, by electromagnetic coupling, to a plasmon generator (PG) adjacent to (above or below) the waveguide at the distal end of the waveguide. Here the waveguide excites plasmon modes in the generator. The plasmon generator is usually made of highly conductive material such as Au or Ag. The optical radiation coupled by the waveguide to the plasmon generator is in turn coupled to the recording medium via plasmon near-field energy, and, thus, heats the surface of recording media. Since the plasmon energy is transferred to the magnetic medium from the near field of the plasmon rather than by directly focusing the optical radiation of the laser, the size of the region on the recording medium that can be effectively heated is not limited by diffraction effects of the radiation and is, therefore, much smaller than would be produced by using the optical radiation directly. It is to be noted that the PG typically terminates at its distal end with a small protruding "peg," whose role is to further concentrate the plasmon energy at the sharpest possibly defined spot on the recording media.

The reliability of TAMR heads is presently of great concern. Since the TAMR recording requires that the recording layer of the magnetic medium be heated above its Curie temperature, the medium itself becomes a significant source of heat. Due to the small gap of approximately 2 nm between the medium surface and the write head, several heat transfer mechanisms can contribute to a heat flux across the air gap between the head and the medium. In particular, the light from the waveguide itself can heat the medium. This heat spot in the medium can significantly increase the temperature of the head which is closely opposite to the heat spot. Since the head surface in that region consists of materials having low thermal conductivity, the increase in head temperature can be great. It is therefore a significant problem to protect the head from the thermal effects of the heated medium surface so that the performance of the head is not degraded by its increasing temperature.

One approach that has been applied to protect the head from excessive heat generated by optical radiation from the waveguide is the use of a waveguide blocker. This is an angled metal layer that is formed against the distal (i.e., closest to the ABS) end of the waveguide so that optical radiation that has not coupled to the plasmon generator is reflected away from the ABS where it does not add to the heating of the medium and write head. The construction and use of such a blocker is taught in Headway application Ser. No. 15/235,171, which is fully incorporated herein by reference.

It is now understood that optical radiation from the waveguide that does not effectively couple to plasmon modes in the plasmon generator, i.e., is "loosely coupled," is also responsible for adversely affecting the sharpness of the heated spot on the recording media, so the elimination of such radiation is an important goal for that reason as well.

The prior art also discloses methods to improve TAMR performance. For example, U.S. Patent Application 2012/0092971 (Shreck et al.) discloses a light block made from opaque material to prevent light from directly entering the waveguide from the light source. U.S. Pat. No. 9,053,717 (Matsumoto et al.) teaches an optical shield to prevent unabsorbed light from getting into the laser cavity of a laser diode. U.S. Pat. No. 7,272,102 (Challener) shows a waveguide having a body that extends into a recess to provide an optical shield between the pole and the flux return pole. However, none of the above references deal with the particular problem to be addressed herein nor can their teachings be applied to that problem in the manner to be applied herein.

SUMMARY

A first object of this disclosure is to provide an optically shielded TAMR write head that uses optically generated plasmon near-field energy for the thermal activation of a magnetic recording medium, that sharpens the heated region on which recording occurs by suppressing light that is loosely coupled to the near field transducer (NFT) and that reduces temperatures of the dielectric head in regions in front of the waveguide (i.e., between the waveguide and the medium).

A second object of this disclosure is to provide such an optically shielded TAMR head wherein, because light that is loosely coupled to the NFT (near field transducer) is suppressed, the optical spot in the recording layer is more sharply defined.

A third object of this disclosure is to improve down-track and cross-track gradients (by 20-30%) relative to those provided by a TAMR write head that uses only a waveguide blocker to reduce excessive optical radiation impinging on a recording medium.

A fourth object of the present disclosure is to improve such thermal gradients without the necessity of overly reducing the size of the PG peg.

These results are obtained by use of a radiation shielding system that incorporates a combination of a waveguide blocker (WGB) formed against the distal end of the waveguide and optical side shields (OSS) formed as symmetrically opposing optically opaque layers flanking the distal end of a plasmon generator (PG), from which end a PPG peg protrudes.

The waveguide blocker (WGB) suppresses optical electromagnetic radiation from the waveguide, that is only loosely coupled to the PG, from impinging upon the recording spot in the medium and on the dielectric material surrounding the writer. The effects of the blocker are augmented by the formation of optically opaque side shields (OSS) to further restrict adverse effects of the loosely coupled optical radiation. This combination operates to effectively reduce unwanted and excessive optical radiation from impinging on a recording medium and, as a result, produces a cleaner (less blurring at the edges) recording spot.

In TAMR, performance requirements call for maximizing down-track and cross-track thermal gradients as these gradients are believed to directly translate to recording quality. At the same time, reliability considerations call for maximizing the plasmon generator's (PG) peg width at the ABS so as to maximize the peg's thermo-mechanical stability. On the other hand, track pitch requirements will limit the maximum allowable peg width, as this will have to be less than or equal to the track pitch. One thus seeks a design that delivers large thermal gradients at the largest possible peg width for a given track pitch. The thermal gradients that can be produced by current state of the art NFTs ("near-field transducers", i.e., the PG and waveguide structures) are limited by excess background light that is not effectively coupled, i.e., it is only loosely coupled to the plasmon modes in the PG (due, in part, to the optical quality of the PG material) and, therefore, it leaks out and "blurs" the edges of the optical and thermal hot spots generated in the media recording layer by the NFT peg. Adding optically opaque shields to suppress this loosely coupled background light will sharpen the heated recording spot to improve thermal gradients as well as allow for a more favorable peg-width/track-pitch ratio. The present optical shield system will enable improved system performance relative to traditional TAMR structures without optical shields. The optical shield system also improves tolerances for most system dimensions thus resulting in an improvement in performance-based device yield.

BRIEF DESCRIPTION OF THE DRAWINGS

FIGS. 1 (a) and (b) differ in the shape of the OSS. FIG. 1 (c) differs also in the angular orientation of an OSS.

FIG. 3(a) shows, schematically, the ABS of FIG. 1(c)

DETAILED DESCRIPTION

Figure 1A:
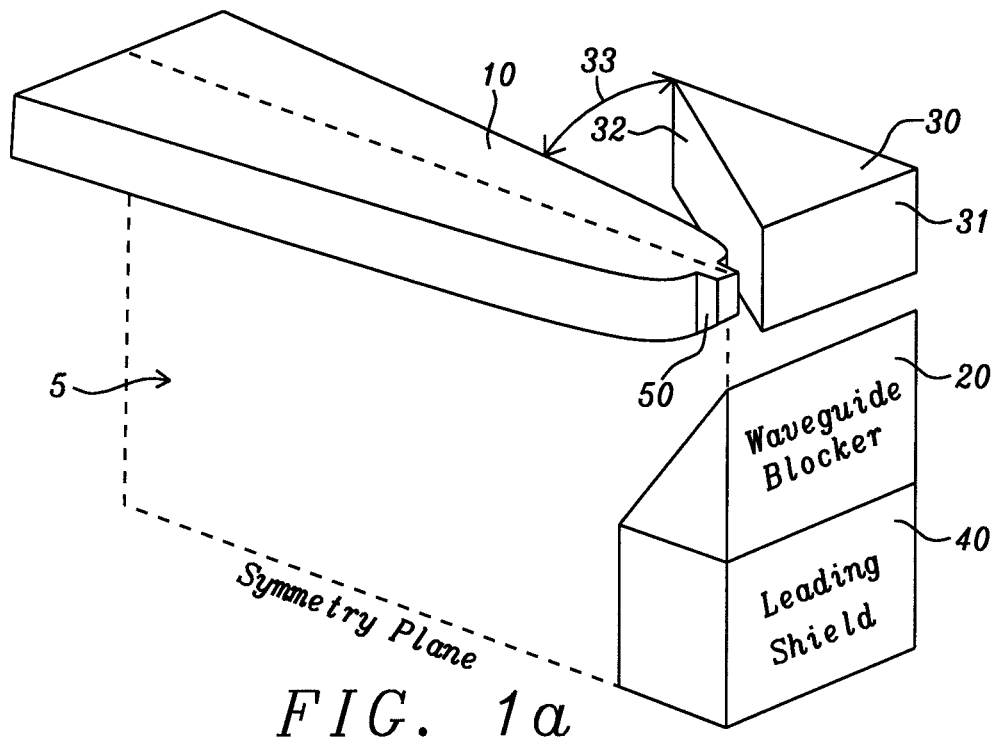
FIGS. 1 (a), (b) and (c) are schematic plan views of selected portions of three embodiments of a TAMR writer showing a propagating plasmon generator (PPG) for transferring optical energy (in the form of near-field plasmon energy) to a recording medium, surrounded by optical side shields (OSS) and coupled from beneath to a waveguide furnished with a blocker.

Referring first to FIGS. 1 (a), 1 (b) and 1 (c) there is shown in each a schematic plan-view of an embodiment of the proposed [PPG/waveguide blocker (WGB)/optical shield (OSS)] system for an optically shielded TAMR. There is shown in each of (a), (b) and (c), the pertinent elements of the system (termed, collectively, the NFT (near-field transducer)), which is substantially (i.e., some variation from absolute symmetry is acceptable) mirror-image symmetric about a symmetry plane 5. The system includes: a propagating plasmon generator (PPG) 10 with a distally projecting peg 50 and a waveguide with a waveguide blocker 20 (here formed of Ru) formed against the distal end of the waveguide core as described in Ser. No. 15/235,171 "Metallic Waveguide Blocker for TAMR". The waveguide blocker is formed upon and thermally contacts a leading shield 40, which also serves as a heat sink for the blocker. Note, a heat sink to dissipate heat is required for the waveguide blocker, but it need not also be a leading shield as it is in this embodiment. The blocker may be formed on the magnetic return pole of the write pole (if such a return pole is present), or it may be formed on a dielectric pedestal. It is to be noted that the PPG is conventionally formed of a single highly conductive material, such as Au; however, the PPG in these embodiments may also be formed as a bilayer of Au and Rh, where the Rh layer, which is not as good a conductor as the Au portion, contains the peg at its distal end.

Also included in the system are separate, substantially symmetrically opposed, optical side shields of optically opaque material, having triangular prismatic shape 30 in FIG. 1 (a), of trapezoidal prismatic shape 35 in 1 (b) and of a more complex shape 38 in 1 (c), which flank the NFT on both sides (only one side being shown), as illustrated in FIGS. 1 (a), 1(b) and 1 (c). Although a symmetrical disposition of the shields (particularly about the peg 50) is preferred, the positioning of the shields may vary slightly from absolute symmetry and they will still perform their function. The optical side shields are configured so that one planar face 31 is coplanar with the ABS plane and a second planar face 32, extends rearward at an angle 33 to the plane of symmetry 5 that is sufficient to clear the curved periphery of the propagating plasmon generator 10. The optical side shields are formed of a mechanically robust and optically opaque material that does not resonate at the frequencies used to activate the TAMR system (i.e., the plasmon frequencies, which here typically correspond to a free-space wavelength of 808 nm.).

Typically, the face 32 extends rearward from the ABS by several hundreds of nanometers. The PPG 10 is formed of a good conductor (Au being used here) or of a bilayer, such as Au and Rh, where Rh is not a particularly good conductor. Further, the PPG may have a parabolic horizontal cross-sectional shape as shown here, but other shapes are possible. A scalable peg 50, to further concentrate the plasmon near-field energy at the recording medium surface, extends distally outward from the apex of the PPG parabola (or similar shape) and terminates in the ABS. As noted, the peg, 50, may extend outward from the Rh layer of the PPG in a bilayer (Au/Rh) configuration of the PPG.

FIG. 1 (b) shows substantially the same system as in 1 (a), but with an optical side shield 35 of trapezoidal prismatic shape which is configured in the same manner as the optical side shield in FIG. 1(a).

FIG. 1 (c) shows a further embodiment of the system in which the optical side shields 38 are of a more complex geometrical shape than in either 1 (a) or 1(b). In particular the optical side shield extends downward to contact the waveguide blocker 20. Note also that the distance between the peg 50 and the inner surface of the shields 38 is approximately 50 nm.

Figure 1B:
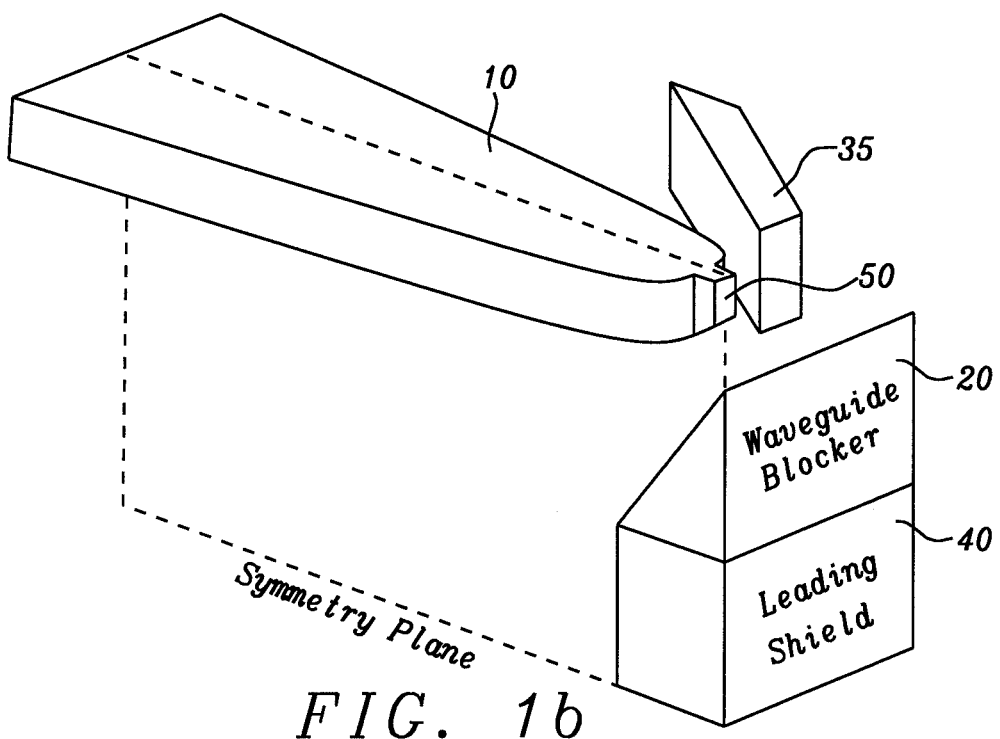
Figure 1C:
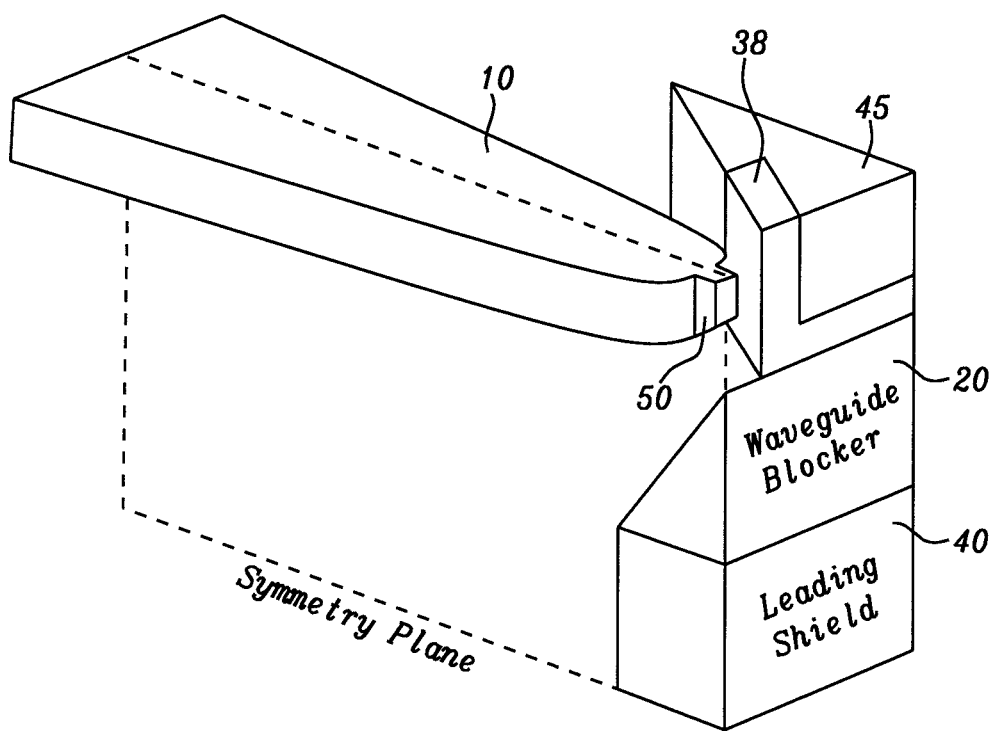

Referring next to FIG. 2 (a), there is shown, schematically (for comparison purposes only), an ABS view of the system of either FIG. 1 (a), 1(b) or 1(c), that includes the waveguide blocker 20, but lacks the optical side shields. There is shown a main write pole 60, laterally abutted by symmetrically disposed and opposing heat sinks 70, typically formed of Ru. Beneath the main write pole there is shown an insulating layer 80, here formed of $Al_2O_3$, but other oxides are also usable. Below layer 80 there is seen the face of the peg 50 that projects outward from the PPG (10 in FIGS. 1(a), 1(b) and 1(c)). Dielectric side cladding material 90, preferably formed of $SiO_2$ surrounds the peg and the sides of the PG and is coplanar with the ABS. Two dielectric oxide layers 100 ($Al_2O_3$), and 110 ($SiO_2$), between the waveguide blocker and the PG and coplanar with the ABS separates the PG from the waveguide blocker (WGB) 20 that is preferably formed of Ru.

Figure 2A:
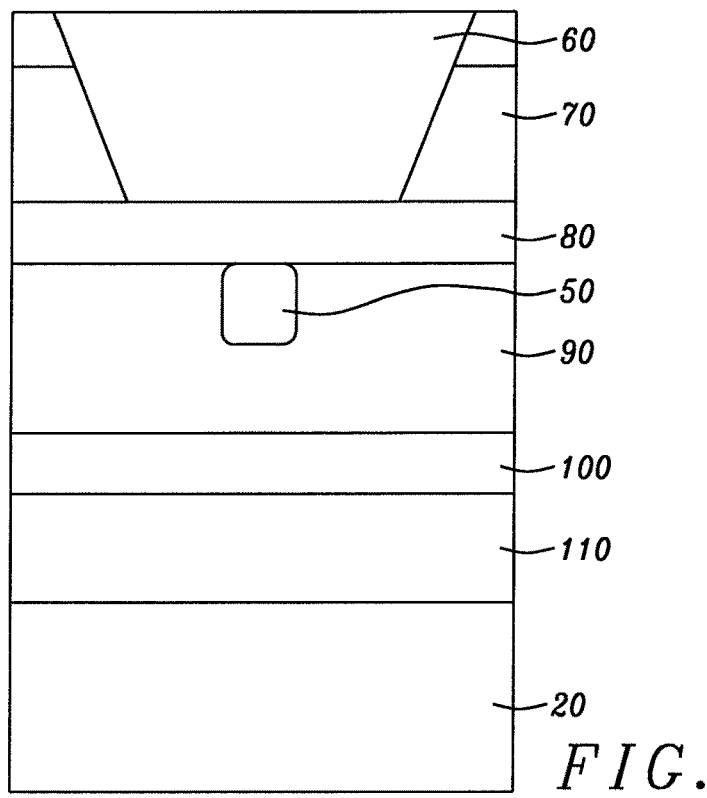
FIGS. 2 (a) and (b) are schematic representations of the ABS plane of a TAMR writer showing, in (a), a system with a waveguide blocker but no OSS and in (b) the system in (a) including an OSS configuration.
Figure 2B:
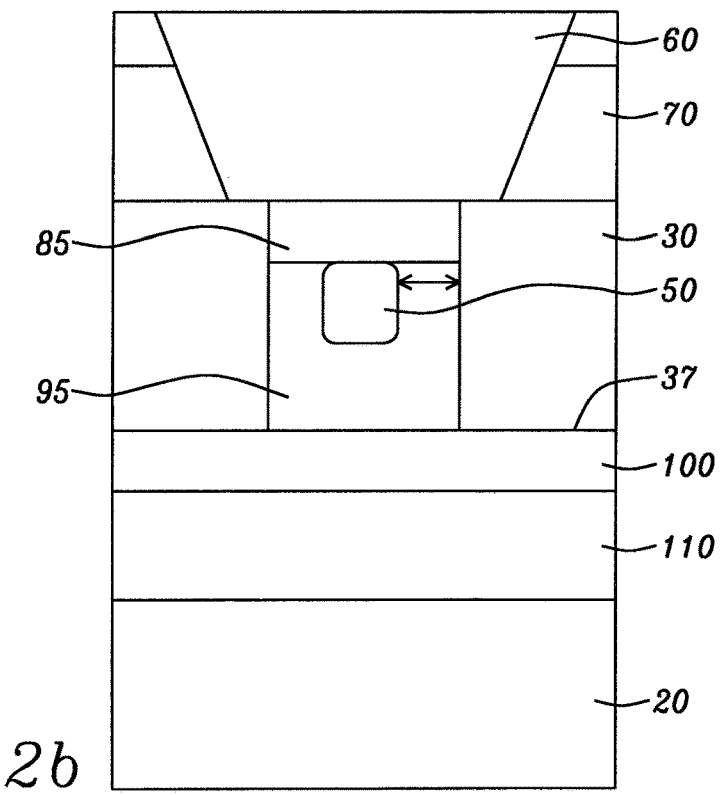

FIG. 2(b) shows, schematically an ABS view of the system in FIG. 2(a), but now including the optical side shields 30 (or 31), as formed in FIG. 1(a) or 1(b). The presence of the side shields alters the appearance of the ABS, as shown in FIG. 2(b), in the following manner. The main pole 60 and symmetrically opposed heat sinks 70 remain as shown in FIG. 2(a). Beneath each heat sink 70 there is now formed one of a symmetrically disposed and opposing pair of optical side shields (OSS) 30 (or 35) as is also seen in FIG. 1(a) as 30 (and as 35 in 1(b)). Because the optical side shields angle inward towards the apex of the PG 10 and the peg 50 that protrudes from the apex, layers 80 and 90 of FIG. 2(a) are narrowed in the ABS and are here denoted as layers 85 and 95. The lateral separation (double headed arrow) between the peg 50 and the inner sides of the optical side shields 30 is ≤70 nm.

At a minimum, the OSS 30 (or 35) should extend in a down-rack direction from the bottom of the main write pole heat sink 70 to the level of the bottom of the PG cladding layer 95, or even as far down as the upper edge of the waveguide blocker (WGB) 20 as illustrated in FIG. 2 (b). Thus, the bottom edge 37 of the OSS could contact the top surface of layer 110 or of waveguide blocker 20. That would be accompanied by a narrowing of layers 100 and 110 to accommodate the extra length of the OSS.

The optical side shields can take the form of triangular prisms extending in the down-track direction (30, in FIG. 1(a)), or may be simply finite width slabs, such as the trapezoidal prisms (shown as 35 in FIG. 1 (b)). In whatever geometrical shape, they should extend several hundreds of nanometers back into the head from the ABS at an angle sufficient to clear the PPG sides (as in FIGS. 1 (a), (b) and (c)).

Referring now to FIG. 1(c), there is shown an embodiment in which each optical side shield 38 extends in a down-track direction until it reaches the upper surface of the waveguide blocker 20, where it conformally contacts that surface (unlike the OSS of 1(a) or 1(b). A dielectric filler 45, typically of $Al_2O_3$ but other oxides such as $Si_2O_3$ are allowable, is formed abutting the outer surface of the OSS 38.

In some configurations, implementation of the optical side shields may require that the waveguide core be tapered laterally (note the "clipping" described below with respect to FIG. 3(a)) in the cross-track direction in the vicinity of the ABS, with the optical side shield leading edge terminating at the waveguide blocker. The optical side shields should be formed of a mechanically robust and optically opaque material that is not resonant at the working wavelength of the NFT, which in the present case is the free-space wavelength of plasmon modes, 808 nm. The preferred material for implementing optical side shields is Ru, which is also a good choice for implementing the waveguide blocker.

Referring now again to FIG. 3(a), there is shown the ABS view of the embodiment of FIG. 1(c), where the optical side shields 38 are shaped other than as simple solid prisms and extend downward to conformally contact the waveguide blocker 20. The planar face of the side shields 38 is shaped as an L, with a vertical side of width approximately 64 nm extending downward from the base of the main pole 60 heat sink layer 70 to the top surface of the waveguide blocker 20. The horizontal base of the L, of thickness approximately 45 nm, extends laterally outward in the cross-track direction and is conformal to the top surface of the waveguide blocker 20. Note that the conformality of the OSS 38 to the top of the waveguide blocker 20 necessitates the clipping of the waveguide core, which is now behind the horizontal portions of the OSS, but would otherwise have extended towards the ABS.

Figure 3C:
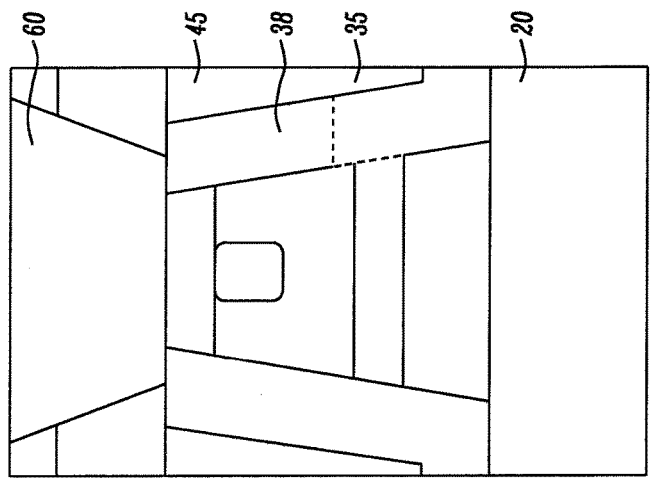
FIG. 3(c) shows an ABS view of FIG. 1(c) pointing out that a certain angular displacement of the OSS can be tolerated.
Figure 3B:
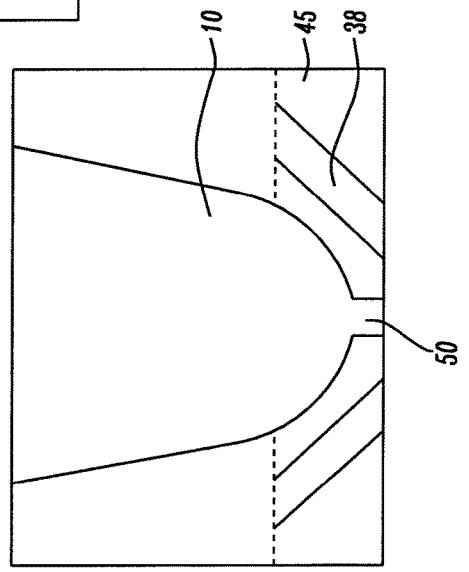
FIG. 3(b) shows a horizontal planar cross-section of FIG. 1(c) taken through the PPG peg.
Figure 3A:
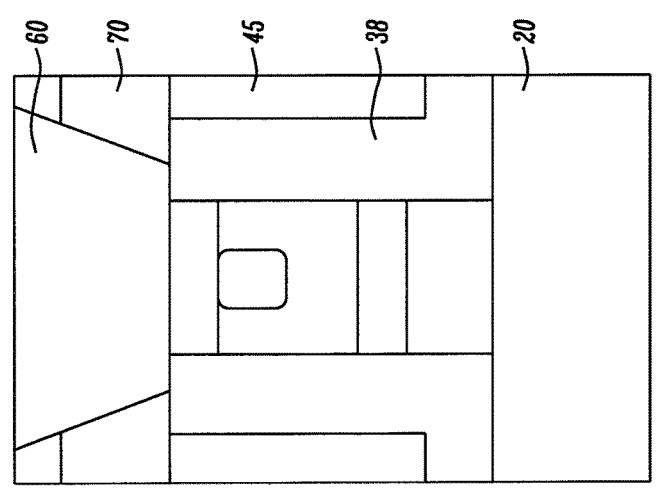
FIGS. 3(a), (b) and (c) each refer to the configuration of FIG. 1(c).

Referring to FIG. 3(b), there is shown a horizontal cross-sectional view of the drawing in FIG. 3(a), with the cross-sectional plane being a slice through the PG peg layer. FIG. 3(b) shows the PG 10 with its protruding peg 50. A portion of each OSS 38 is shown extending rearward (away from the ABS for a distance denoted the "throat height", which is the inner extent of the waveguide blocker WGB) at an angle to the plane of symmetry that is approximately 45°. The edge of the OSS emerges at the ABS and is separated from the closest edge of the peg 50 by 70±20 nm. The thickness (between parallel edges) of the OSS layer is approximately 45 nm.

Referring next to FIG. 3(c) there is shown an ABS view of the same system as in FIG. 3(a), except that the front face of each OSS is shown to have a side-wall angle of between approximately 70-90° to the vertical. A slight side-wall angle, in practice, is quite likely to occur, and if kept within these bounds will not have a negative impact on the effect of the shields.

Figure 4A:
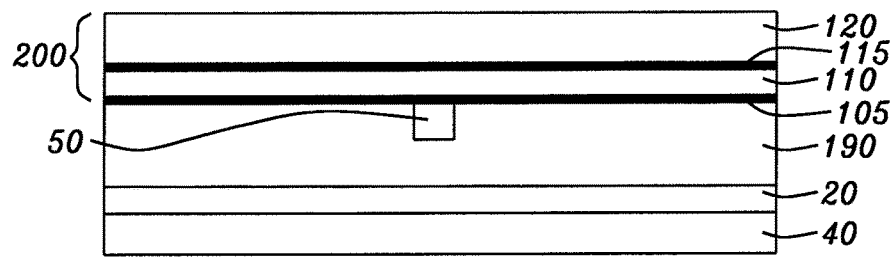
FIGS. 4 (a)-4 (n) are a sequence of schematic illustrations depicting the formation of the TAMR of FIG. 1(c).
Figure 4B:
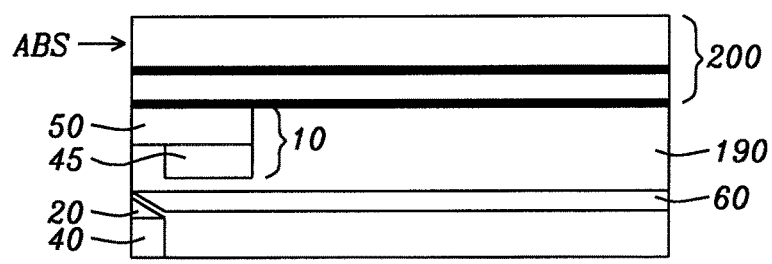
Figure 4C:
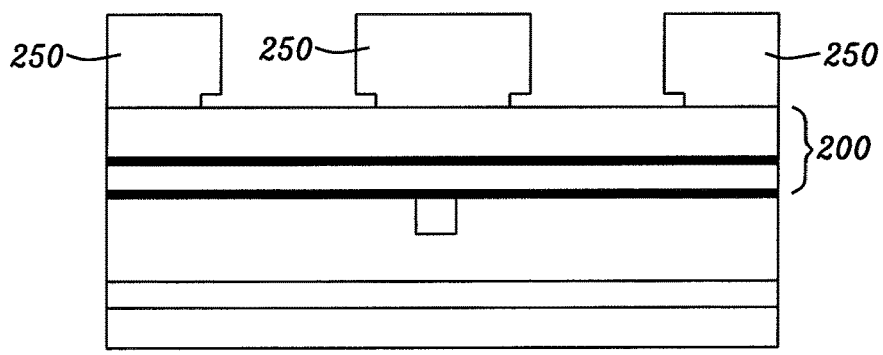
Figure 4D:
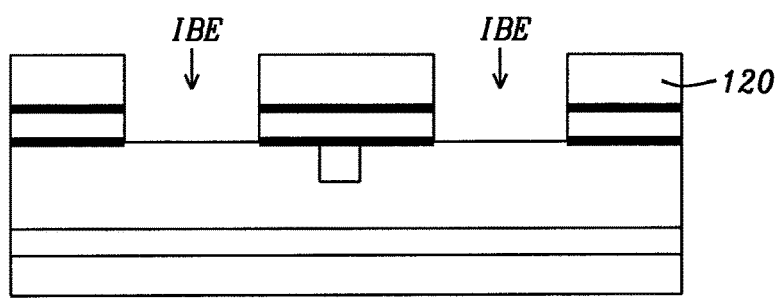
Figure 4E:
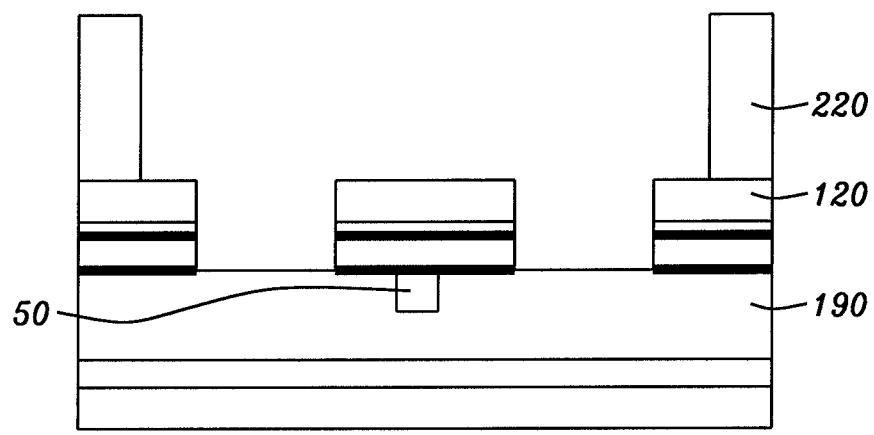
Figure 4F:
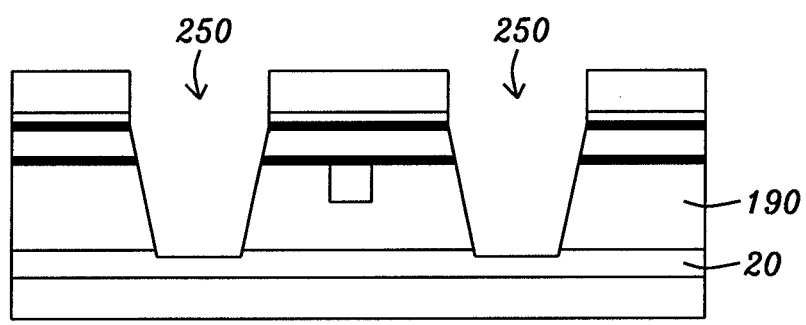
Figure 4G:
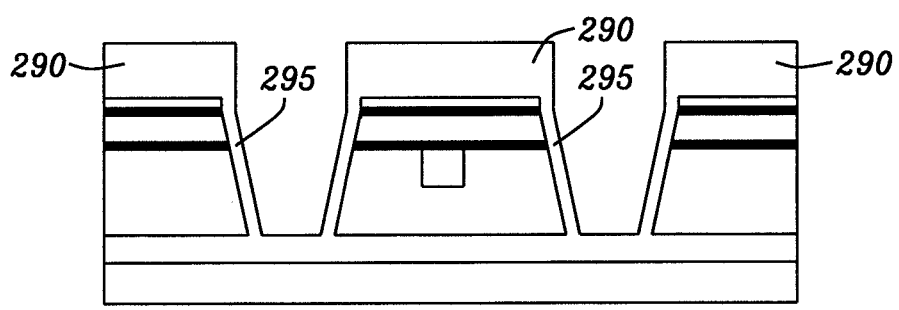
Figure 4H:
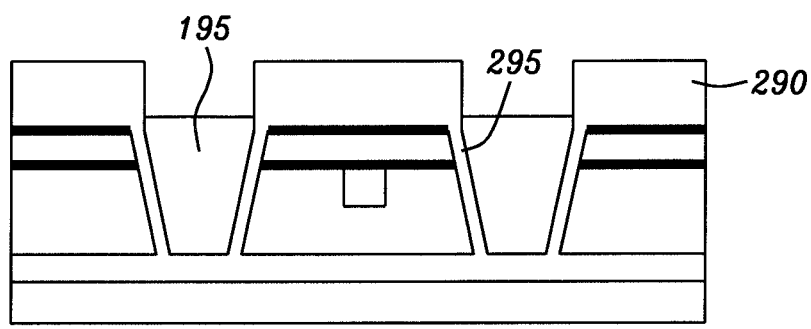
Figure 4I:
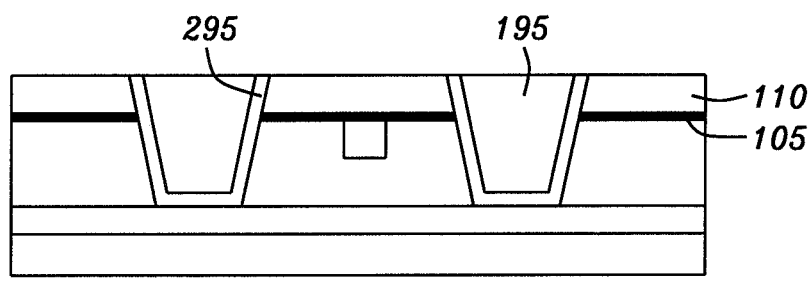
Figure 4J:
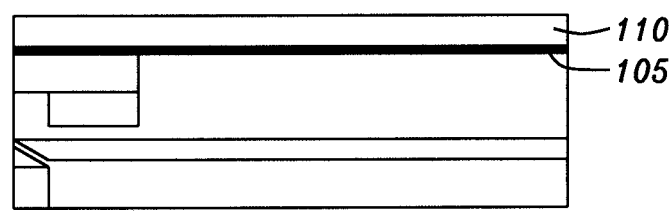
Figure 4K:
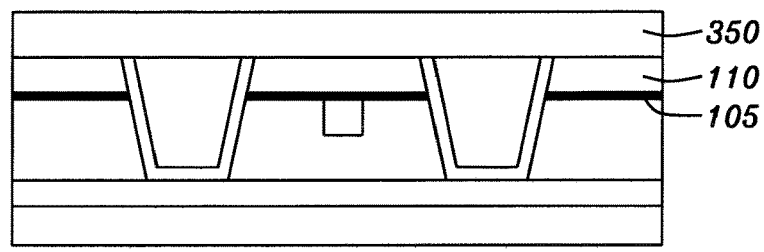
Figure 4L:
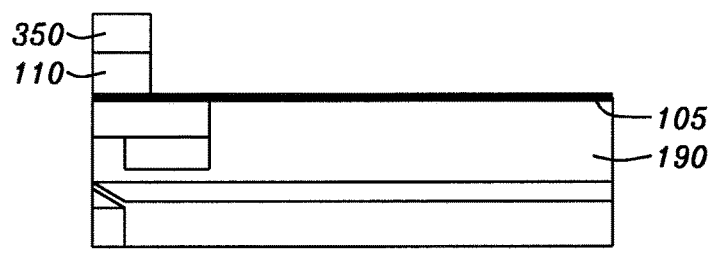
Figure 4M:
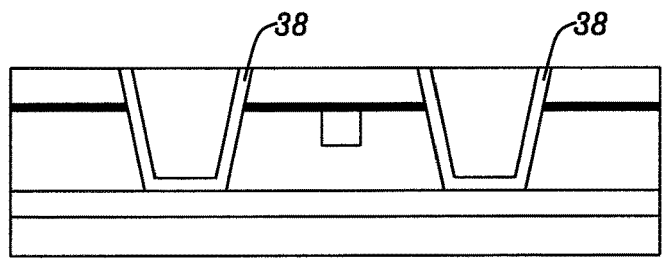
Figure 4N:
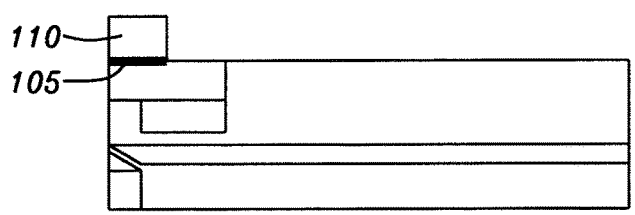

Referring next to FIGS. 4(a)-4(n), there will be shown schematically a sequence of steps to fabricate the optical side shields on a substrate that already includes a bilayer NFT device (i.e., an Au PG with a Rh peg layer formed adjacent to a waveguide). The method of formation of the PG can be found in Ser. No. 15/011,892, and the method of the formation of an adjacent waveguide that includes a waveguide blocker can be found in Ser. No. 15/235,171. The PG and waveguide, together, is typically denoted the NFT (Near-Field Transducer) device. We note that the waveguide itself will be altered in shape by the positioning of the optical side shields.

Referring first to FIGS. 4(a) and 4(b) there is shown an ABS view 4(a) and a vertical X-section view 4(b) of an initial step in a process for fabricating optical side shields laterally disposed about an already fabricated PG (10 in FIG. 4(b)). The PG fabrication is presented as a layered substrate 100 that includes a heat-sink (or shield) layer 40, a Ru waveguide blocker 20, a waveguide layer 60 terminating against the blocker, and a bi-layer PG 10, here formed as a peg layer 50 above a PG layer 45. The substrate has been smoothed by a CMP (chemical mechanical processing) process. A film stack 200 is formed over the peg layer 50 on the smoothed substrate. The stack includes a first protective ALD $Al_2O_3$ (atomic layer deposition of alumina) layer 105, a layer of $SiO_2$ 110, a second protective ALD $Al_2O_3$ layer 115 and a Ru metal mask (MM) layer 120.

Referring now to FIG. 4(b), there is shown schematically a side X-section view of the system in FIG. 4(a), which shows structures in 4(a) that are hidden when seen from the ABS. The protruding peg 50 is shown extending to the ABS from its peg layer which is formed above the PPG layer 45 that cannot be seen in FIG. 4(a). The PG structure is surrounded by cladding material 190 formed of $SiO_2$, (but other oxides are possible).

Referring next to schematic FIG. 4(c), there is shown in ABS view the fabrication of 4(a) with the addition of a bilayer photoresist deposition 250 on the Ru metal mask 120 in preparation for the patterning of the Ru metal mask to create the optical side shields. The line width (width of patterned regions) is approximately 200 nm.

Referring next to schematic FIG. 4(d), there is shown the fabrication in FIG. 4(c) subsequent to an ion beam etch (IBE) that transfers the pattern in the photoresist 250 to the Ru metal mask 120. The IBE extends downward through the mask 120, both ALD $Al_2O_3$ layers, 105 and 115 and the $SiO_2$ layer 110 between the two ALD $Al_2O_3$ layers. The photoresist bilayer has then been removed.

Referring next to schematic FIG. 4(e) there is shown the fabrication of FIG. 4(d) subsequent to a second layer of photoresist 220 being spun onto the now patterned metal mask layer 120 and itself patterned to expose the NFT region (active waveguide region) in preparation for reactive ion etching (RIE) of the $SiO_2$ oxide layer 190 surrounding the peg 50. The RIE will etch away the regions of 190 exposed by patterned openings created by the previous IBE.

Referring next to schematic FIG. 4(f) there is shown the fabrication of FIG. 4(e) showing the removal of regions of oxide layer 190 by action of the RIE through the patterned openings 250. The RIE has been stopped by the waveguide blocker 20.

Referring next to schematic FIG. 4(g), there is shown the fabrication of FIG. 4(f) with the addition of a deposition of a film 290 of Ru over all exposed surfaces, thereby conformally lining 295 the inner walls of the etched out oxide layer 190. This lining of Ru will become the required optical side shields as shown in FIG. 3c.

Referring next to schematic FIG. 4(h) there is shown the fabrication of FIG. 4(g) subsequent to a full film deposition 195 of $SiO_2$ by plasma enhanced chemical vapor deposition (PECVD) to fill the openings in oxide layer 190 now conformally covered by the Ru deposition 295.

Referring next to schematic FIG. 4(i) there is shown the fabrication of FIG. 4(h) subsequent to the removal of the Ru film 290 and Ru metal mask 120 by an IBE and followed by a CMP step to smooth the upper surface.

Referring also to schematic FIG. 4(j), there is shown the fabrication of FIG. 4(i) in a side cross-sectional view in a plane through the peg 50.

Referring next to schematic FIG. 4(k), there is shown the fabrication of FIG. 4(i) with the deposition of a coating of photoresist 350 on top of the optical side shield structures and the exposed $SiO_2$ 110. The photoresist is patterned to define the throat height between the peg and the write pole. Throat height can be seen in FIG. 3(b) as the distance between the ABS edge of the peg 50 and the horizontal dashed line where the optical side shields terminate.

Referring now to schematic FIG. 4(l), there is shown the fabrication of 4(k) in a side cross-sectional view. The photoresist layer 350 extends rearward to define the throat height. The portion of $SiO_2$ 110 not protected by the photoresist has been removed by the RIE.

Referring finally to FIGS. 4(m) and 4(n) there is shown schematically, in both ABS (4(m)) and side views (4(n)), the fabrication of FIG. 4(k) with the photoresist having been stripped away along with the ALD $Al_2O_3$ layer 105. The system is now prepared to accept the magnetic write pole as shown as 38, for example, in FIG. 3(*c*) and for lateral trimming to leave the required width of the structure.

Revisions and modifications may be made to methods, materials, structures and dimensions employed in forming and providing an optically shielded TAMR magnetic write head having a plasmon generator in which plasmon modes are activated by a waveguide with a waveguide blocker and symmetrically flanked by optically opaque side shields, while still forming and providing such a device and its method of formation in accord with the spirit and scope of the present disclosure as defined by the appended claims.

What is claimed is:

1. An optically shielded TAMR (Thermally Assisted Magnetic Recording) write head comprising:
    a magnetic writer having a main write pole emerging at a distal ABS (air-bearing surface);
    write pole heat sink layers symmetrically disposed to either side of said main write pole;
    a waveguide formed adjacent to said main write pole configured for directing electromagnetic radiation at a plasmon generator;
    said plasmon generator formed adjacent to said waveguide and positioned beneath said main pole, wherein said plasmon generator is electromagnetically coupled to said waveguide at a distal end of said waveguide, whereby plasmon modes are excited within said plasmon generator, said modes having near-field energy that said plasmon generator is configured to direct at a confined region of a recording medium immediately adjacent to said ABS of said main write pole, within which confined region said near fields produce Joule heating of said recording medium;
    a scalable, metallic peg emerging distally from said plasmon generator and configured to further concentrate said near-field plasmon energy within said confined region of said recording medium; and
    a system configured for shielding said recording medium from portions of said electromagnetically coupled optical radiation that are only loosely coupled and may impinge on said recording medium and its surroundings while said write head is operational, said system further comprising:
    a waveguide blocker conformally abutting against said distal end of said waveguide, wherein said waveguide blocker is configured to prevent said loosely coupled radiative energy from said waveguide from being transferred to said confined region of said recording medium and its surroundings; and
    optical side shields formed of optically opaque material laterally disposed adjacent to and substantially symmetrically opposing said plasmon generator, wherein said optical side shields are configured to further prevent loosely coupled radiative energy from said waveguide from being transferred to said recording medium and its surroundings: wherein
    said optical side shields are triangular prisms or trapezoidal prisms or irregular prisms, said prisms having a first face that is coplanar with said ABS plane and a second face that extends rearward from said first face and makes an angle with a symmetry plane that provides a clearance between said second face and a periphery of said plasmon generator.

2. The TAMR write head of claim 1 wherein both said optical side shields and said waveguide blocker are formed of Ru.

3. The TAMR write head of claim 1 wherein said first face is L-shaped, with a vertical portion extending vertically downward from said main pole heat sink layer to contact said waveguide blocker and a horizontal portion extending horizontally outward from said vertical portion and having a lower edge that is conformal to an upper edge of said waveguide blocker.

4. The TAMR write head of claim 1 wherein said first face has an angular L-shape, with an obtuse angle between the two portions of the L, wherein the vertical portion of the L extends vertically downward from said main pole heat sink layer to contact said waveguide blocker and a horizontal portion extending horizontally outward from said vertical portion and having a lower edge that is conformal to an upper edge of said waveguide blocker.

5. The TAMR write head of claim 4 wherein said L shape has an approximately vertical portion that makes an obtuse angle of between 70° and 90° with a horizontal portion, wherein said approximately vertical portion is of width approximately 64 nm and wherein said horizontal portion is of thickness approximately 45 nm and wherein said side shield extends rearward in a direction away from the periphery of said plasmon generator with an angle of approximately 45°.

6. The TAMR write head of claim 3 wherein said L shape has a vertical portion of width approximately 64 nm and a horizontal portion of thickness approximately 45 nm and that extends rearward in a direction away from the periphery of said plasmon generator with an angle of approximately 45°.

7. The TAMR write head of claim 1 wherein outer edges of said peg are separated from inner edges of said optical side shields by ≤70 nm.

8. The TAMR write head of claim 1 wherein said plasmon generator has a flat parabolic horizontal cross-sectional shape and is aligned symmetrically above said waveguide.

9. The TAMR write head of claim 1 wherein said plasmon generator is formed of Au.

10. The TAMR write head of claim 6 wherein said plasmon generator is formed as a bilayer comprising a layer of Au over a layer of Rh.

11. The TAMR write head of claim 1 wherein said plasmon generator may be aligned symmetrically above or below said waveguide.

12. The TAMR write head of claim 1 wherein said waveguide blocker is formed upon a magnetic return pole which also acts as a leading edge shield.

13. The TAMR write head of claim 1 wherein said waveguide blocker is formed upon a magnetic return pole which also acts as a leading edge shield and a heat sink layer.

14. The TAMR write head of claim 1 wherein said waveguide blocker is formed upon a heat sink layer.

15. A method for forming an optically shielded TAMR head, comprising:
    providing a magnetic write head having a main write pole with write pole side shields horizontally symmetrically disposed about said write pole; and a heat sink layer formed on a leading edge side of said main write pole; then
    forming a layered structure beneath said main write pole wherein said layered structure includes a plasmon generator (PG) including a peg layer having a scalable peg configured to concentrate plasmon near-field energy within a confined region on a magnetic recording medium; wherein said layered structure further includes a waveguide layer formed beneath said PG, wherein said waveguide layer will be configured to couple optical radiation to plasmon modes in said PG and wherein said waveguide has a waveguide blocker formed against a distal end and wherein said waveguide blocker contacts said heat sink layer; then planarizing said peg layer of said layered structure using chemical mechanical polishing (CMP) and forming a pair of optically opaque side shields on said planarized layered structure wherein said optically opaque side shields are substantially symmetrically disposed about said PPG, and wherein said side shields will further define said waveguide shape and wherein said optically opaque side shields are configured to block loosely coupled optical radiation from impinging on said confined region.

16. The method of claim 15 wherein said pair of optically opaque side shields are formed by a method further comprising:

depositing on said planarized peg layer of said layered structure a sequence of additional layers including, in the following order:

a first atomic layer deposition of $Al_2O_3$ (ALD $Al_2O_3$) as a protective layer on said peg layer;

a layer of $SiO_2$ on said first ALD $Al_2O_3$ layer;

a second ALD $Al_2O_3$ protective layer on said oxide layer; and a metal mask (MM) layer on said second ALD $Al_2O_3$ layer, wherein said metal mask layer will be patterned to define said optically opaque side shields.

17. The method of claim 16 wherein said optical side shields are patterned by a method further comprising:

depositing a bilayer coating of photoresist (PR) on said MM layer and patterning said bilayer coating with said optical side shield feature; then transferring said pattern to said MM layer using an ion beam etch (IBE); then stripping off said PR; then depositing a second layer of PR patterned to expose a region of a cladding layer on either side of said peg for reactive ion etching (RIE); then etching away all of said cladding layer on either side of said peg and stopping at said waveguide blocker.

18. The method of claim 17 further comprising:

depositing a film of the same metal material forming said waveguide blocker to conformally cover exposed sides of said waveguide layer created by said RIE, wherein said film layer forms said optical side shields; then filling the space within said film covered RIE region with a PECVD (plasma enhanced chemical vapor deposition) of $SiO_2$; then planarizing said deposition of $SiO_2$; then using an IBE (ion-beam etch), removing remnants of said MM and said metal material forming said optical side shields; then patterning said upper surface of the resulting fabrication to create a peg-to-pole spacer between the top of said peg and the bottom of said main pole and to establish a proper throat height.

19. The method of claim 18 wherein said MM layer, said waveguide blocker layer and said metal film layer creating said optical side shields is a layer of Ru.

20. The method of claim 19 wherein said Ru metal film layer forming said optical side shields is formed to a thickness between approximately 35 to 65 nm.

21. The method of claim 19 wherein said optical side shields are formed of a mechanically robust and optically opaque material that is not resonant at the working wavelength of said plasmon generator, which is a free-space wavelength of 808 nm, whereby a preferred material for both said optical side shields and said waveguide blocker is Ru.

22. The TAMR writer of claim 1 wherein said optical side shields are formed of a mechanically robust and optically opaque material that is not resonant at the working wavelength of said plasmon generator, which is a free-space wavelength of 808 nm, whereby a preferred material for implementing both said optical side shields and said waveguide blocker is Ru.

* * * * *